(12) United States Patent
Jette

(10) Patent No.: US 7,959,019 B2
(45) Date of Patent: Jun. 14, 2011

(54) SUSPENDED CABLE SUPPORT SYSTEM

(76) Inventor: Roger Jette, West Islip, NY (US)

( * ) Notice: Subject to any disclaimer, the term of this patent is extended or adjusted under 35 U.S.C. 154(b) by 473 days.

(21) Appl. No.: 11/854,671

(22) Filed: Sep. 13, 2007

(65) Prior Publication Data

US 2008/0066401 A1 Mar. 20, 2008

Related U.S. Application Data

(60) Provisional application No. 60/844,480, filed on Sep. 14, 2006.

(51) Int. Cl.
*A47F 5/08* (2006.01)

(52) U.S. Cl. .......................................... 211/117

(58) Field of Classification Search ................ 211/117, 211/181.1, 119; 248/68.1, 49, 52, 58, 65, 248/75, 302, 67.7
See application file for complete search history.

(56) References Cited

U.S. PATENT DOCUMENTS

| | | | | |
|---|---|---|---|---|
| 573,835 | A * | 12/1896 | Taylor | 211/119 |
| 804,906 | A * | 11/1905 | Wheeler | 211/117 |
| 1,236,318 | A * | 8/1917 | King | 211/181.1 |
| 1,421,705 | A * | 7/1922 | Melish | 220/7 |
| 1,681,418 | A * | 8/1928 | Livesay | 211/119 |
| 1,788,724 | A * | 1/1931 | Libera | 220/485 |
| 2,149,821 | A * | 3/1939 | Sutherland | 312/45 |
| 2,191,693 | A * | 2/1940 | Havlis | 211/74 |
| 2,467,411 | A * | 4/1949 | Tingdale | 40/308 |
| 2,620,074 | A * | 12/1952 | Moore, Jr. | 211/119 |
| 3,203,558 | A * | 8/1965 | Ullman | 211/126.1 |
| 3,363,048 | A | 1/1968 | Vaughn | |
| 3,503,521 | A * | 3/1970 | Rogus | 211/119 |
| 3,752,352 | A | 8/1973 | Senecal | |
| 3,805,964 | A * | 4/1974 | Titus, Jr. | 211/59.2 |
| 3,817,395 | A * | 6/1974 | LeFever | 211/170 |
| 3,844,440 | A | 10/1974 | Hadfield et al. | |
| 3,951,270 | A * | 4/1976 | Kiss | 211/119 |
| 4,124,324 | A | 11/1978 | Augis et al. | |
| 4,162,730 | A * | 7/1979 | Steere et al. | 211/118 |
| 4,372,510 | A | 2/1983 | Skypala | |
| 4,456,125 | A * | 6/1984 | Chap | 206/513 |
| 4,593,499 | A | 6/1986 | Kobayashi et al. | |
| 4,596,095 | A | 6/1986 | Chalfant | |

(Continued)

FOREIGN PATENT DOCUMENTS

DE 2155 625 11/1971

(Continued)

OTHER PUBLICATIONS

International Search Report from PCT/US07/20218 dated Apr. 15, 2008.

*Primary Examiner* — Jennifer E. Novosad
(74) *Attorney, Agent, or Firm* — Carter, DeLuca, Farrell & Schmidt, LLP

(57) ABSTRACT

According to an aspect of the present disclosure, a suspended cable support system is provided. The suspended cable support system includes a plurality of suspension rods; and at least one cable tray. Each cable tray includes a pair of stringer elements, wherein each stringer element is configured for connection to at least one suspension rod; and a channel section depending from the pair of stringer elements. The channel section defines a passageway for supporting runs of cable thereon. The channel section includes a plurality of riser portions connected to the pair of stringer elements.

4 Claims, 17 Drawing Sheets

U.S. PATENT DOCUMENTS

| | | | |
|---|---|---|---|
| 4,612,746 A | 9/1986 | Higgins | |
| 4,630,417 A | 12/1986 | Collier | |
| 4,637,181 A | 1/1987 | Cohen | |
| 4,676,036 A | 6/1987 | Bessert | |
| 4,765,495 A * | 8/1988 | Bisk | 211/113 |
| 4,765,576 A | 8/1988 | Peled | |
| 4,850,162 A | 7/1989 | Albrecht | |
| 5,049,700 A | 9/1991 | Kobayashi et al. | |
| 5,100,008 A * | 3/1992 | O'Herron | 211/106 |
| 5,123,618 A | 6/1992 | Gutterman et al. | |
| 5,169,010 A * | 12/1992 | Fortner | 211/86.01 |
| 5,263,289 A | 11/1993 | Boyd | |
| 5,384,937 A * | 1/1995 | Simon | 24/295 |
| 5,389,737 A | 2/1995 | Kobayashi et al. | |
| 5,409,192 A | 4/1995 | Oliver | |
| 5,412,914 A | 5/1995 | Daw et al. | |
| 5,423,437 A * | 6/1995 | Kayem | 211/70.7 |
| 5,460,279 A * | 10/1995 | Emery et al. | 211/106 |
| 5,460,280 A * | 10/1995 | Feddeler | 211/116 |
| 5,477,649 A | 12/1995 | Bessert | |
| 5,483,776 A | 1/1996 | Poppe | |
| 5,548,932 A | 8/1996 | Mead | |
| RE35,479 E | 3/1997 | Witherbee et al. | |
| 5,628,157 A | 5/1997 | Chen | |
| 5,630,300 A | 5/1997 | Chen | |
| 5,673,522 A | 10/1997 | Schilham | |
| 5,697,193 A | 12/1997 | Forslund, III et al. | |
| 5,727,700 A * | 3/1998 | Digney | 211/119 |
| 5,768,840 A | 6/1998 | Feldpausch et al. | |
| 5,775,209 A * | 7/1998 | Tiemann | 99/426 |
| 5,875,902 A * | 3/1999 | Emery et al. | 211/90.03 |
| 5,893,539 A * | 4/1999 | Tran et al. | 248/68.1 |
| 5,901,515 A | 5/1999 | Chen | |
| 5,946,867 A | 9/1999 | Snider et al. | |
| 6,019,323 A * | 2/2000 | Jette | 248/49 |
| 6,059,258 A | 5/2000 | Jackson | |
| 6,209,267 B1 | 4/2001 | Dantzer | |
| 6,247,871 B1 * | 6/2001 | Nickel et al. | 403/396 |
| 6,286,691 B1 * | 9/2001 | Oberhaus et al. | 211/118 |
| 6,329,591 B2 | 12/2001 | Karst et al. | |
| 6,336,296 B1 | 1/2002 | Ishibashi et al. | |
| 6,341,704 B1 * | 1/2002 | Michel, Jr. | 211/181.1 |
| 6,347,493 B1 | 2/2002 | Jette | |
| 6,354,048 B1 | 3/2002 | Gillett et al. | |
| 6,397,539 B1 | 6/2002 | Kimura | |
| 6,409,031 B1 * | 6/2002 | Wynne | 211/119 |
| 6,427,400 B1 | 8/2002 | Greenblatt | |
| 6,595,120 B1 * | 7/2003 | Tiemann | 99/426 |
| 6,637,704 B2 | 10/2003 | Jette | |
| 6,688,478 B2 * | 2/2004 | Miller et al. | 211/59.2 |
| 6,855,884 B2 * | 2/2005 | Spagnoli et al. | 174/507 |
| 7,544,895 B2 | 6/2009 | Penichon | 174/135 |
| 7,546,987 B2 | 6/2009 | Sinkoff | 248/68.1 |
| 7,597,203 B2 * | 10/2009 | Jasniy | 211/119 |
| 2002/0008074 A1 * | 1/2002 | Spencer | 211/49.1 |
| 2002/0023888 A1 * | 2/2002 | Wynne et al. | 211/119 |
| 2007/0119805 A1 * | 5/2007 | Nawrocki | 211/119 |
| 2008/0017760 A1 * | 1/2008 | Larsen et al. | 248/49 |
| 2008/0264883 A1 * | 10/2008 | Stafford et al. | 211/107 |
| 2009/0008512 A1 * | 1/2009 | Davis et al. | 248/49 |

FOREIGN PATENT DOCUMENTS

| | | |
|---|---|---|
| EP | 0399 790 | 11/1990 |
| EP | 0 683 554 | 11/1995 |
| FR | 2 599 906 | 12/1987 |
| GB | 2 015 268 | 9/1979 |
| JP | 6-272365 | 9/1994 |
| JP | 6-317005 | 11/1994 |
| WO | WO 90/10966 | 9/1990 |

* cited by examiner

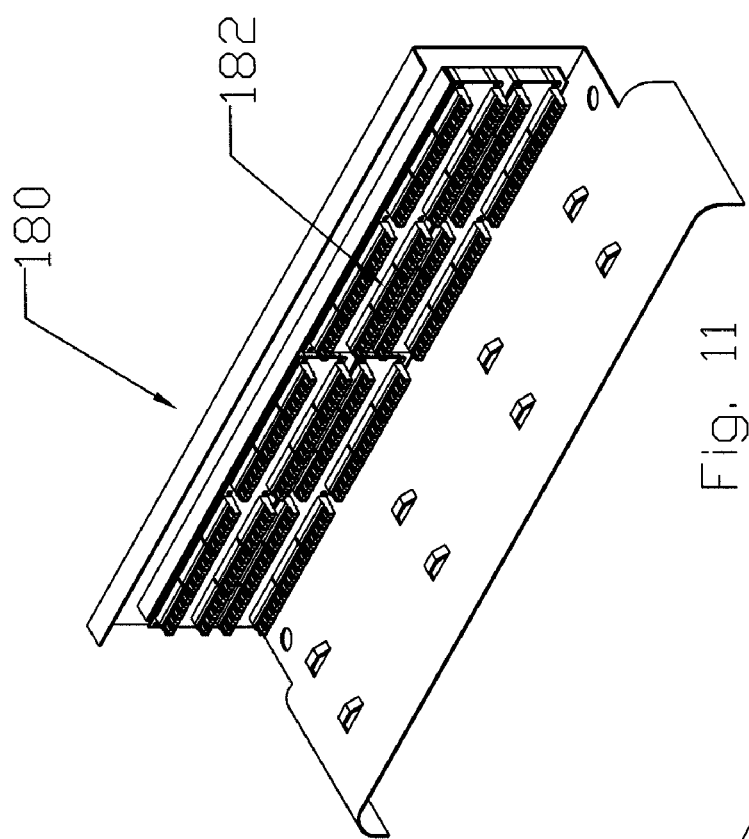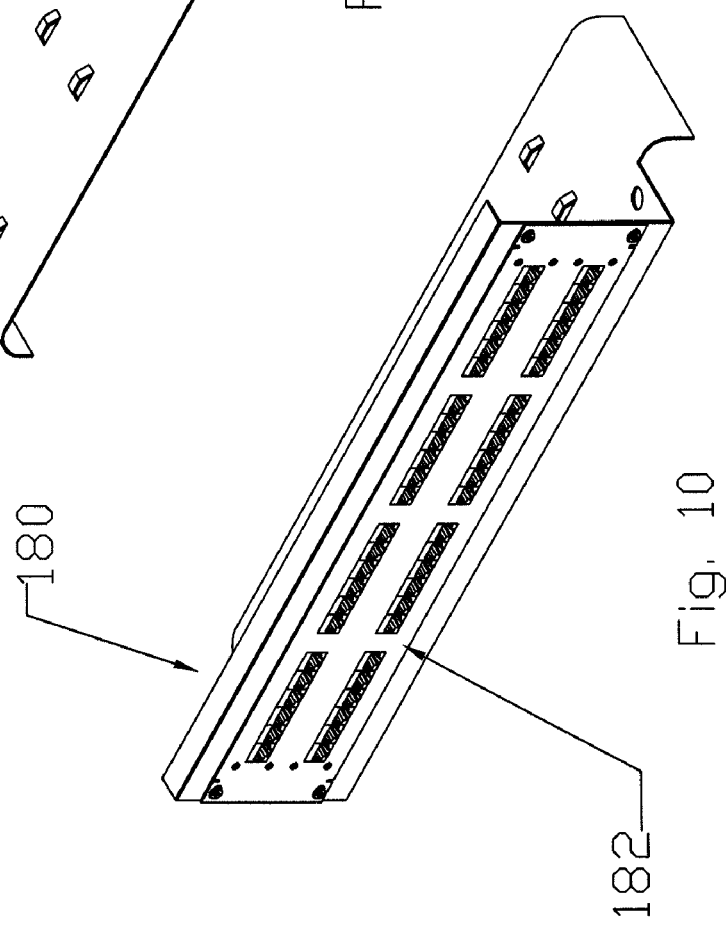

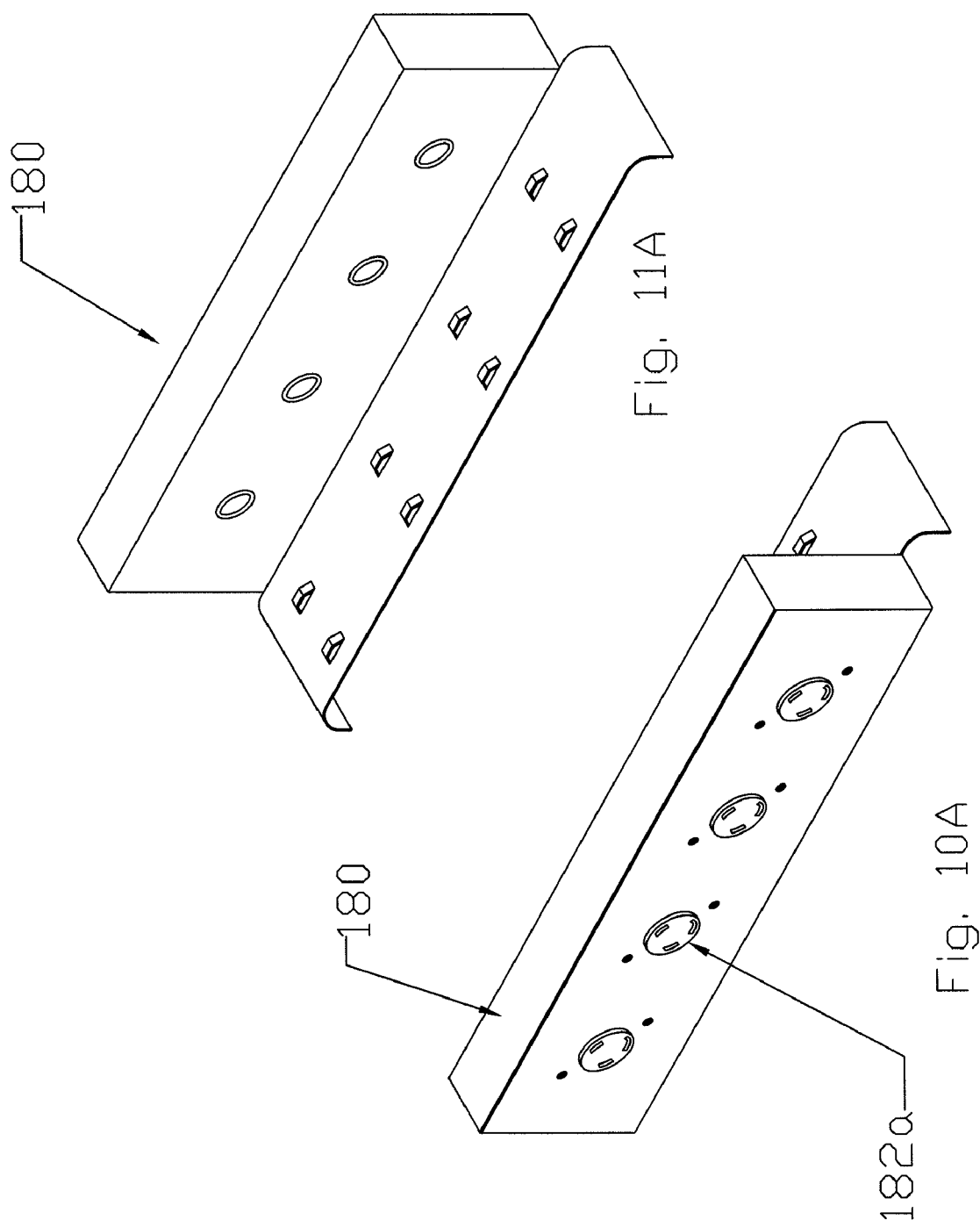

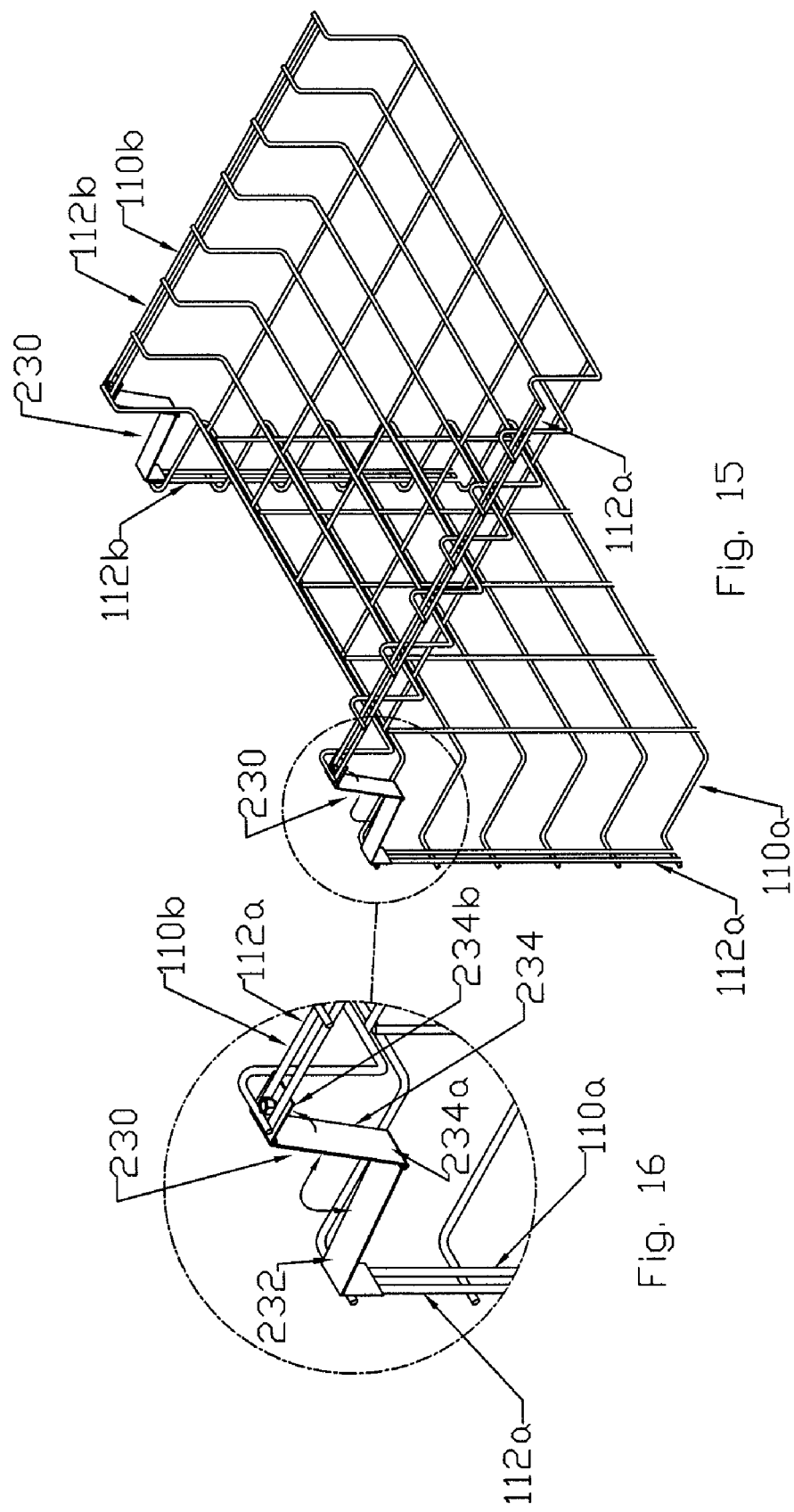

SUSPENDED CABLE SUPPORT SYSTEM

CROSS-REFERENCE TO RELATED APPLICATION

The present application claims the benefit of and priority to U.S. Provisional Application Ser. No. 60/844,480, filed on Sep. 14, 2006, the entire content of which is incorporated herein by reference.

BACKGROUND

1. Technical Field

The present disclosure relates to suspended support systems and, more particularly, to a cable support system capable of being suspended.

2. Description of Related Art

Cable suspension systems have been developed to provide the additional utility space needed in various different conduit or cable intensive environments where the original construction did not provide adequate means of accommodating the vast amount of conduit or cable. For example, probably the most common environment requiring vast amounts of additional protected space is for large computing systems. Such installations were typically made in facilities which simply were not designed to accommodate the vast amount of cable runs required to operate the typical large computer system. Other applications where additional utility space is required include mechanical systems, e.g., heating, ventilating and air conditioning systems.

A common problem experienced in utilizing cable suspension systems is maintaining organization of the various cables, conduits, pipes, etc. which are routed above the floor, proximate the ceiling and the like. One solution to this problem is to provide a cable tray system suspended from the ceiling to contain and direct cables along their respective pathways.

One drawback of such a suspension systems is the additional labor required to assemble the various components of the separate sections making up the suspension system. In geographic regions with particularly high labor rates, the cost of erecting such a labor intensive system could prove to be cost prohibitive. An additional drawback of such systems is the high cost of storing and shipping the components of the system in that the components may not be readily stacked and/or nested in order to reduce storage space and the like.

Accordingly, there is a continuing need for improved cable suspension and management systems which require a fewer number of components.

A need also exists for cable suspension and management systems which are easier to install than existing systems and which provide increased storage capacity and accessibility.

An additional need exists for cable suspension and management systems which require reduced storage space and reduced shipping costs.

SUMMARY

According to an aspect of the present disclosure, a suspended cable support system is provided. The suspended cable support system includes a plurality of suspension rods; and at least one cable tray. Each cable tray includes a pair of stringer elements, wherein each stringer element is configured for connection to at least one suspension rod; and a channel section depending from the pair of stringer elements. The channel section defines a passageway for supporting runs of cable thereon. The channel section includes a plurality of riser portions connected to the pair of stringer elements.

The channel section may be formed of wire stock. Each stringer element may include a pair of spaced apart rails. The channel section may define a floor spaced a distance from a plane defined by the pair of stringer elements, wherein the floor is supported by the riser portions.

The channel section may include a plurality of longitudinal sections and a plurality of transverse sections defining a cage-like enclosure. The longitudinal sections may be disposed beneath the transverse sections. The channel section may further include at least one transversely extending reinforcing rib disposed beneath the longitudinal sections.

The channel section may be arcuate or substantially T-shaped. The suspended cable support system may further include a divider configured for selective connection to the channel section for dividing the passageway.

The suspended cable support system may further include at least one suspension bracket configured for connection to the channel section; and a cable management system selectively connectable to the suspension bracket so as to depend therefrom. The cable management system may include a plurality of cable supports depending from a bendable spine. Each suspension bracket may be configured for connection on a top surface of a stringer element.

The suspended cable support system may further include a strut supported beneath at least one of the stringer elements. Each strut may have a substantially U-shaped transverse cross-sectional profile.

The suspended cable support system may further include a plurality of cable trays, and at least one hinge interconnecting adjacent cable trays to enable adjacent cable trays to bend off-axis relative to one another.

The cable trays may be configured for stacking one on top of another in a nesting fashion.

The suspension rods may extend between the pair of rails of the stringer elements.

According to another aspect of the present disclosure, a cable tray, for use in a cable support system including a plurality of suspension rods, is provided. The cable tray includes a pair of stringer elements each having a pair of spaced apart rails, wherein at least one suspension rod of the cable support system extends between the pair of rails; and a channel section depending from the pair of stringer elements, wherein the channel section defines a passageway for supporting runs of cable thereon. The channel section includes a plurality of riser portions connected to the pair of stringer elements; a floor spaced a distance from a plane defined by the pair of stringer elements, wherein the floor is supported by the riser portions; and a plurality of longitudinal section and a plurality of transverse sections defining a cage-like enclosure.

The longitudinal sections may be disposed beneath the transverse sections. The channel section may include at least one transversely extending reinforcing rib disposed beneath the longitudinal sections.

The cable trays may be configured for stacking one on top of another in a nesting fashion. The cable trays are at least one of arcuate and T-shaped.

According to a further aspect of the present disclosure, a cable support system is provided. The cable support system includes a plurality of suspension rods; and at least one cable tray supported on at least one of the plurality of suspension rods. Each cable tray includes a first stringer element defined by a pair of spaced apart rails; at least a second stringer element defined by a pair of spaced apart rails, wherein the first and second stringer elements are spaced apart from one another and each stringer element is configured for connection to at least one suspension rod; and a channel section depending from the pair of stringer elements, the channel section defining a passageway for supporting runs of cable thereon, the channel section including a plurality of riser portions connected to the pair of stringer elements. The cable trays are configured for stacking one on top of another in a nesting fashion.

The channel section may be formed of wire stock. The channel section may define a floor spaced a distance from a plane defined by the pair of stringer elements. The floor may be supported by the riser portions. The channel section may include a plurality of longitudinal sections and a plurality of transverse sections defining a cage-like enclosure.

The cable support system may further include a divider configured for selective connection to the channel section for longitudinally dividing the passageway.

The cable support system may still further include at least one suspension bracket configured for connection to the channel section; and a cable management system selectively connectable to the suspension bracket so as to depend therefrom. The cable management system may include a plurality of cable supports depending from a bendable spine.

The cable support system may further include a strut supported beneath at least one of the stringer elements. Each strut may have a substantially U-shaped transverse cross-sectional profile.

The cable support system may further include a plurality of cable trays, and at least one hinge interconnecting adjacent cable trays to enable adjacent cable trays to bend off-axis relative to one another.

The pair of rails of each stringer element may be spaced apart an amount sufficient for the suspension rods to extend therebetween.

BRIEF DESCRIPTION OF THE DRAWINGS

Preferred embodiments of the presently disclosed cable suspension and support system are described herein with reference to the drawings, wherein:

FIG. 10 is a front perspective view of a patch panel accessory for the support system of FIG. 1;

FIG. 10A is a front perspective view of an alternate patch panel accessory for the support system of FIG. 1;

FIG. 11 is a rear perspective view of the patch panel accessory of FIG. 10;

FIG. 11A is a rear perspective view of the patch panel accessory of FIG. 10A;

FIG. 15 is a perspective view of a pair of cable trays shown hingedly joined to one another;

FIG. 16 is an enlarged perspective view of the indicated area of detail of FIG. 15;

FIG. 17 is an enlarged perspective view of the indicated area of detail of FIG. 1;

FIG. 18 is an enlarged perspective view of the indicated area of detail of FIG. 1;

FIG. 19 is an enlarged perspective view of the indicated area of detail of FIG. 1;

FIG. 20 is an enlarged perspective view of the indicated area of detail of FIG. 1;

DETAILED DESCRIPTION OF EMBODIMENTS

Figure 1:
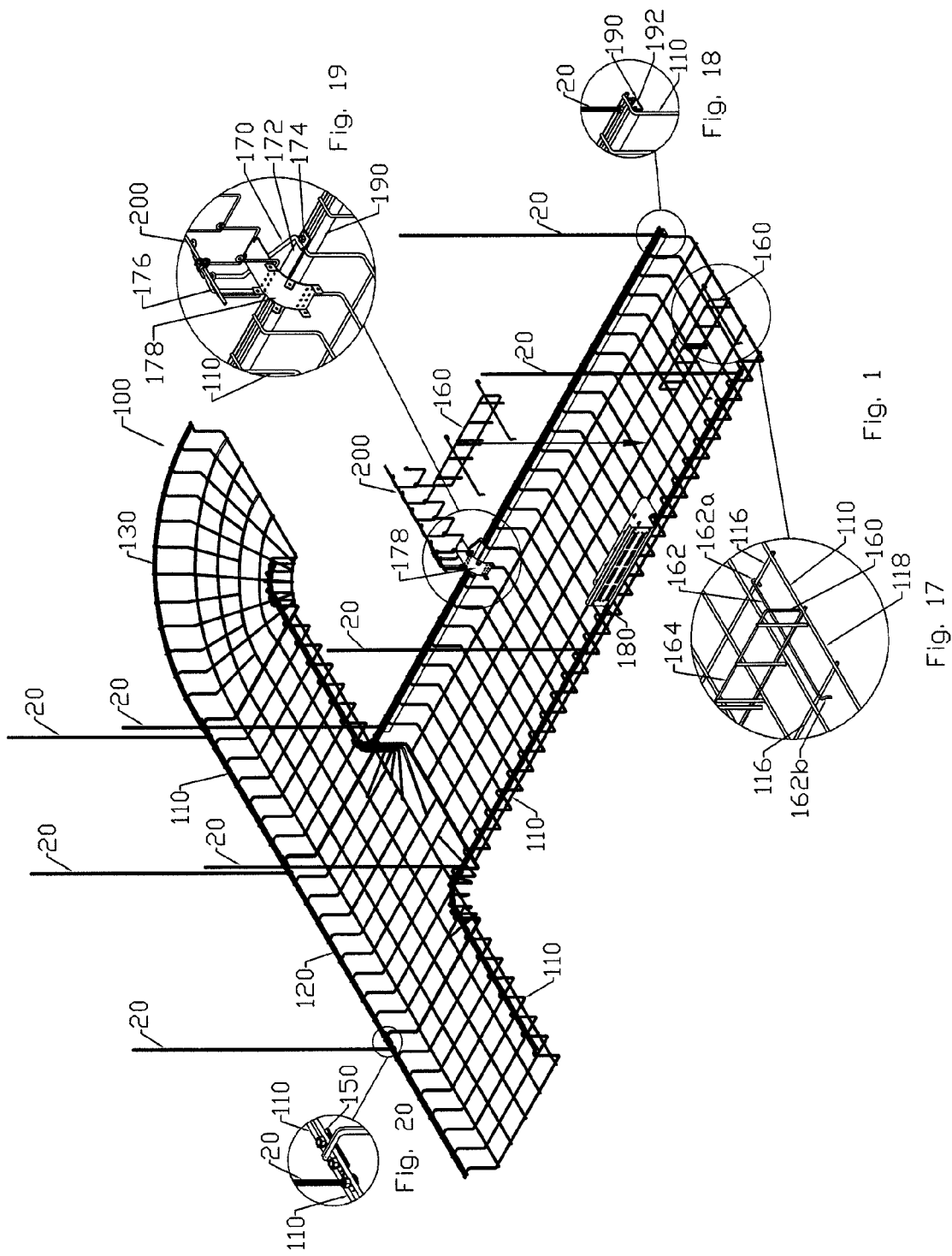
FIG. 1 is a perspective view of one embodiment of a cable support system constructed in accordance with an embodiment of the present disclosure.

Referring now in specific detail to the drawings in which like reference numerals identify similar or identical elements throughout the several views, and initially to FIG. 1, one embodiment of a support system constructed in accordance with the present disclosure is shown generally as cable support system 100.

Generally, cable support system 100 includes a series of suspension rods or the like 20 depending from a ceiling, soffit, rafter or other suitable over-head structure (not shown). Cable support system 100 further includes any number of linear cable trays 110, T-shaped cable trays 120 and/or arcuate cable trays 130. It is contemplated and understood that the number of cable trays 110, 120 and 130 may vary from installation to installation depending on the need and configuration of the supporting structure.

Figure 13:
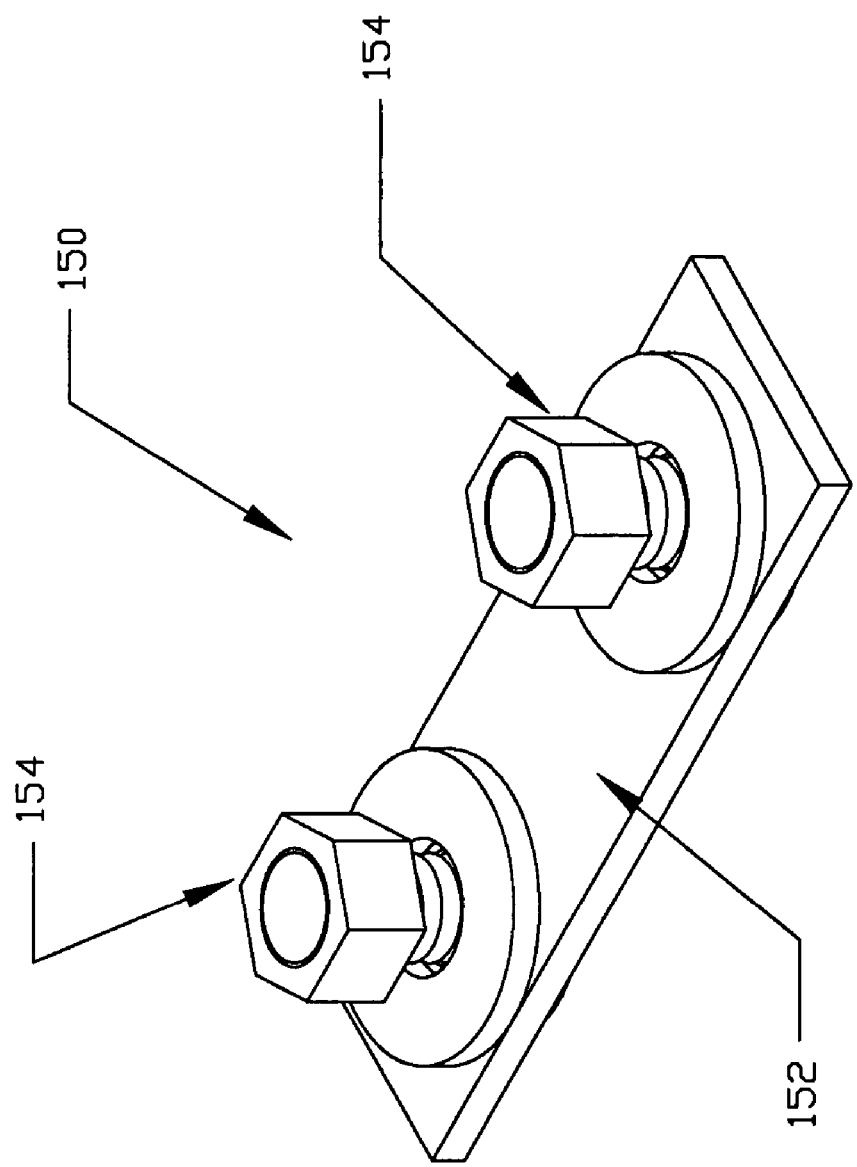
FIG. 13 is a perspective view of a coupling element of the support system of FIG. 1.

As seen in FIG. 1, various cable trays 110, 120, 130 may be joined to one another by a coupling element 150 (see FIG. 13) including a plate 152 which extends between adjacent trays and is selectively secured to each of the adjacent trays by fastening means 154, such as, for example, nuts and bolts or the like.

Turning now to FIGS. 1-4, each linear cable tray 110 includes first and second elongated stringer elements 112a and 112b, respectively. A channel section 114 is suspended from stringers 112a, 112b so as to form a portion of a passageway for supporting cable runs thereon. In the illustrated embodiment, channel section 114 is formed of an open ended wire stock basket having longitudinal sections 116 attached to transverse sections 118. Transverse sections 118 include riser portions or legs 118a which are attached to a top side or an underside of stringers 112a, 112b. Legs 118a are substantially orthogonal with respect to transverse sections 118. The various elements of cable tray 110 are joined by suitable known techniques, such as by welding.

Figure 4:
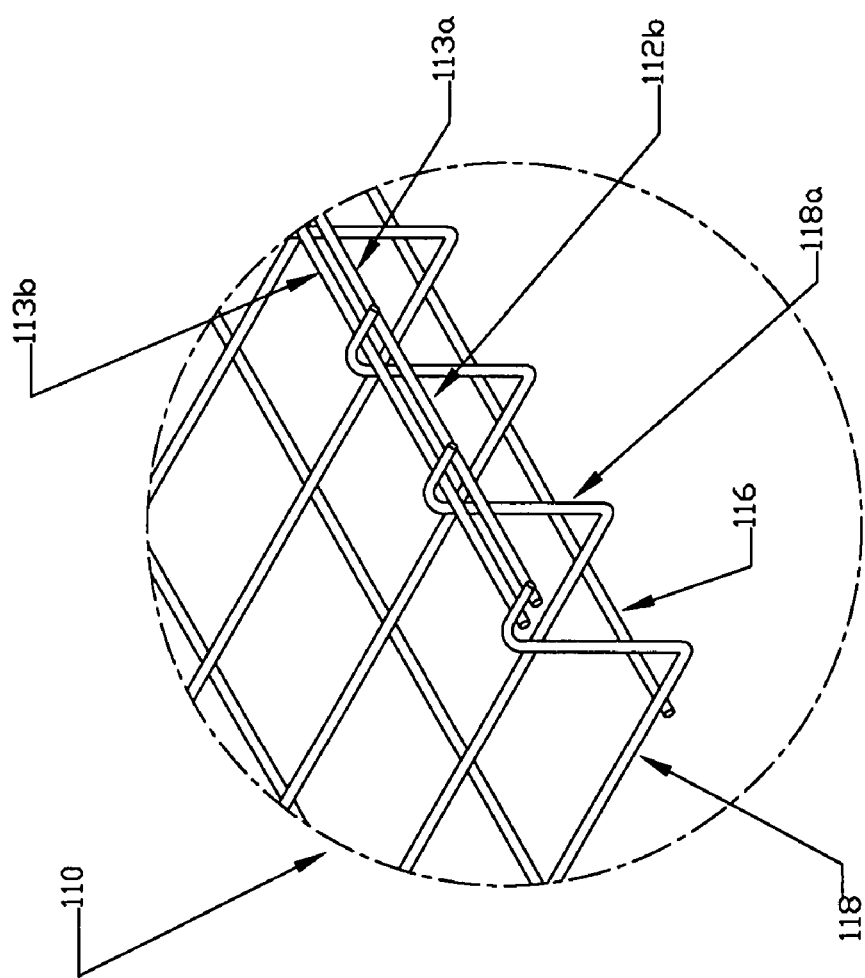
FIG. 4 is an enlarged perspective of the indicated area of detail of FIG. 3.

As best seen in FIG. 4, each stringer 112a, 112b includes at least a pair of spaced apart rails 113a, 113b. Rails 113a, 113b define a plane which is substantially parallel to a plane defined by longitudinal sections 116 and transverse sections 118. The plane defined by rails 113a, 113b is also substantially orthogonal to legs 118a. Each rail 113a, 113b may be formed of wire stock of the like.

Figure 2:
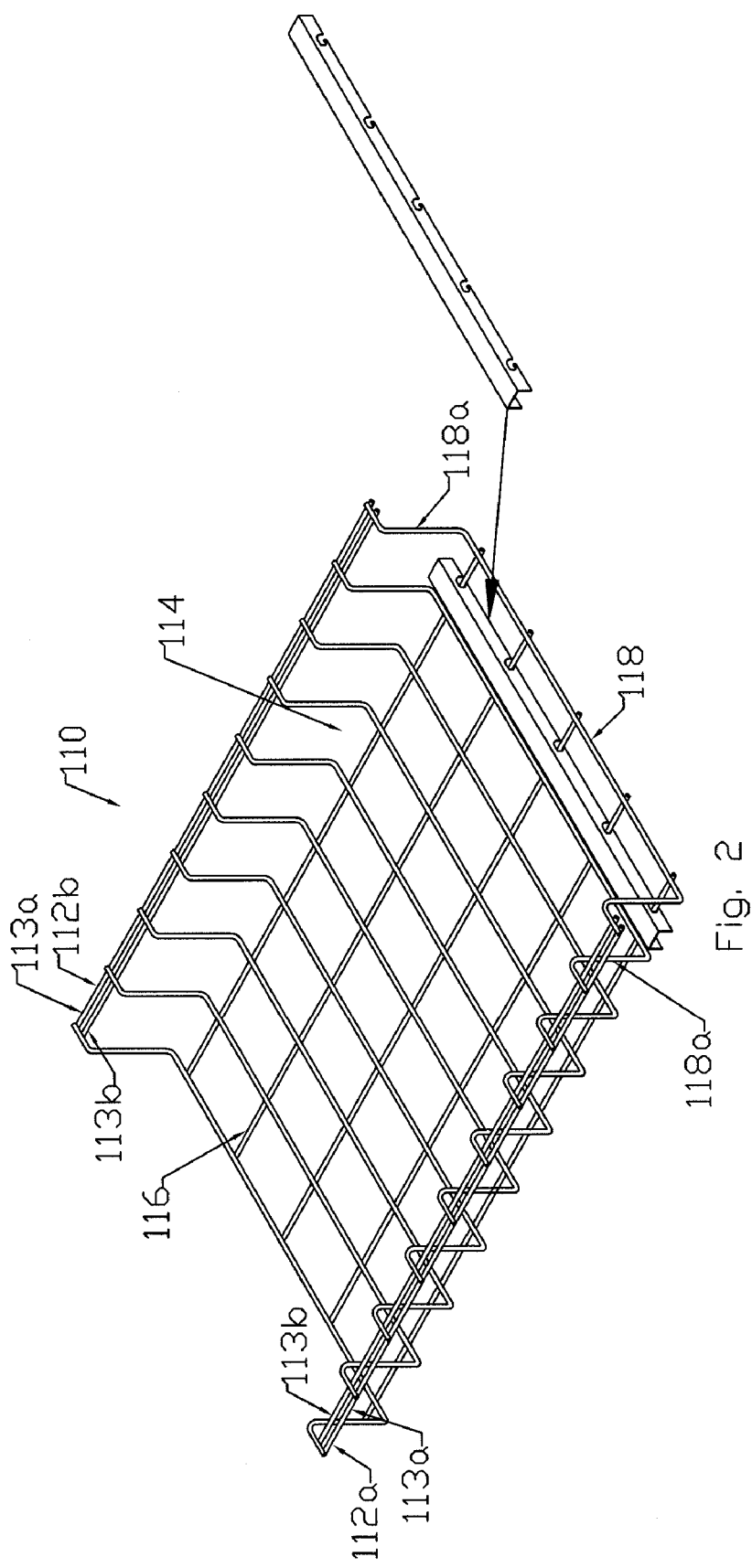
FIG. 2 is a perspective view, with parts separated, of a linear cable tray of the support system of FIG. 1, shown in a stacking/nesting configuration.
Figure 3:
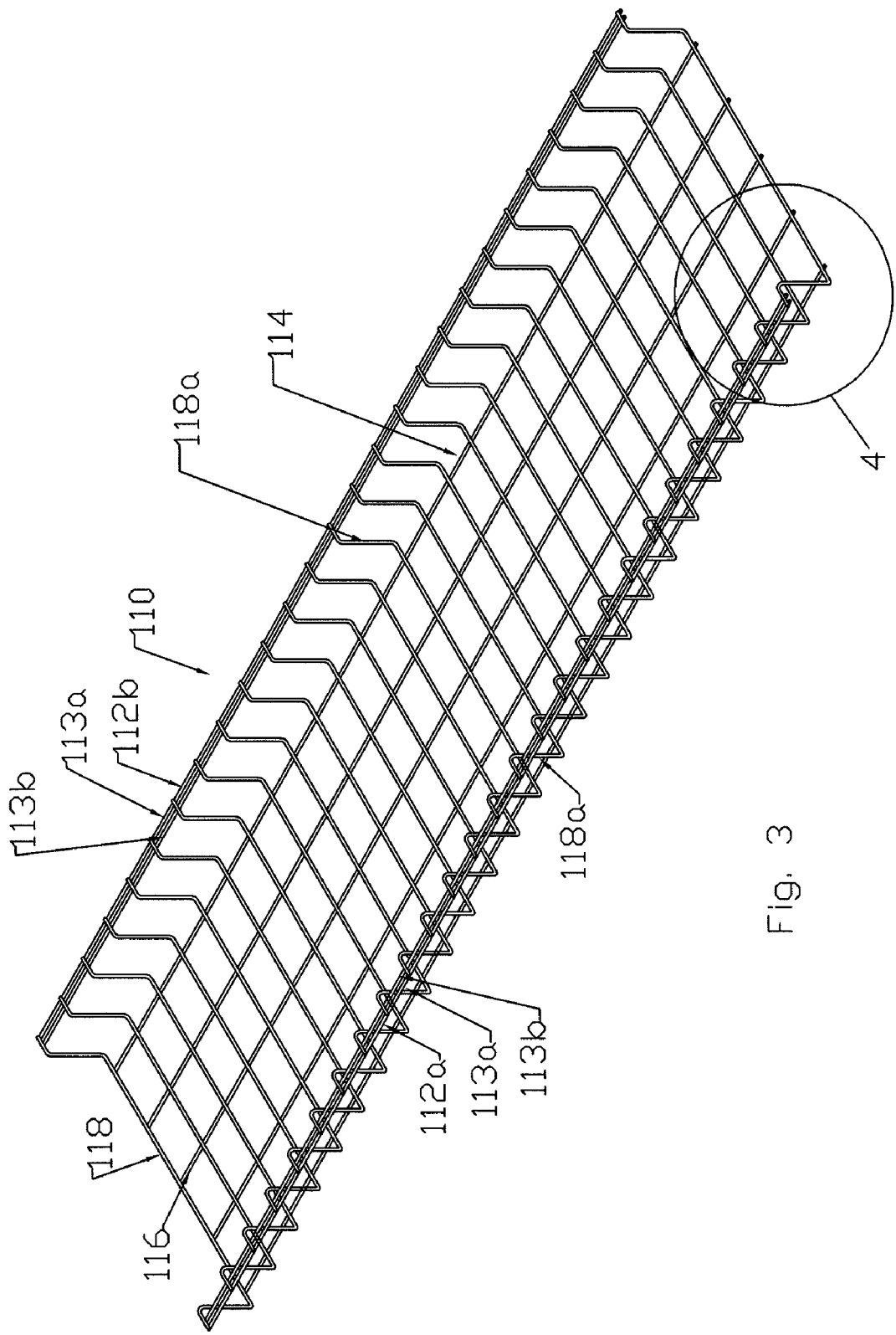
FIG. 3 is a perspective view a plurality of cable trays of FIG. 2 illustrated in an end-to-end configuration.

As seen in FIGS. 2 and 3, linear cable trays 110 may have varying lengths or multiple linear cable trays 110, as seen in FIG. 2, may be joined to one another in end to end fashion to form an elongate linear cable tray 110, as seen in FIG. 3.

Figure 5:
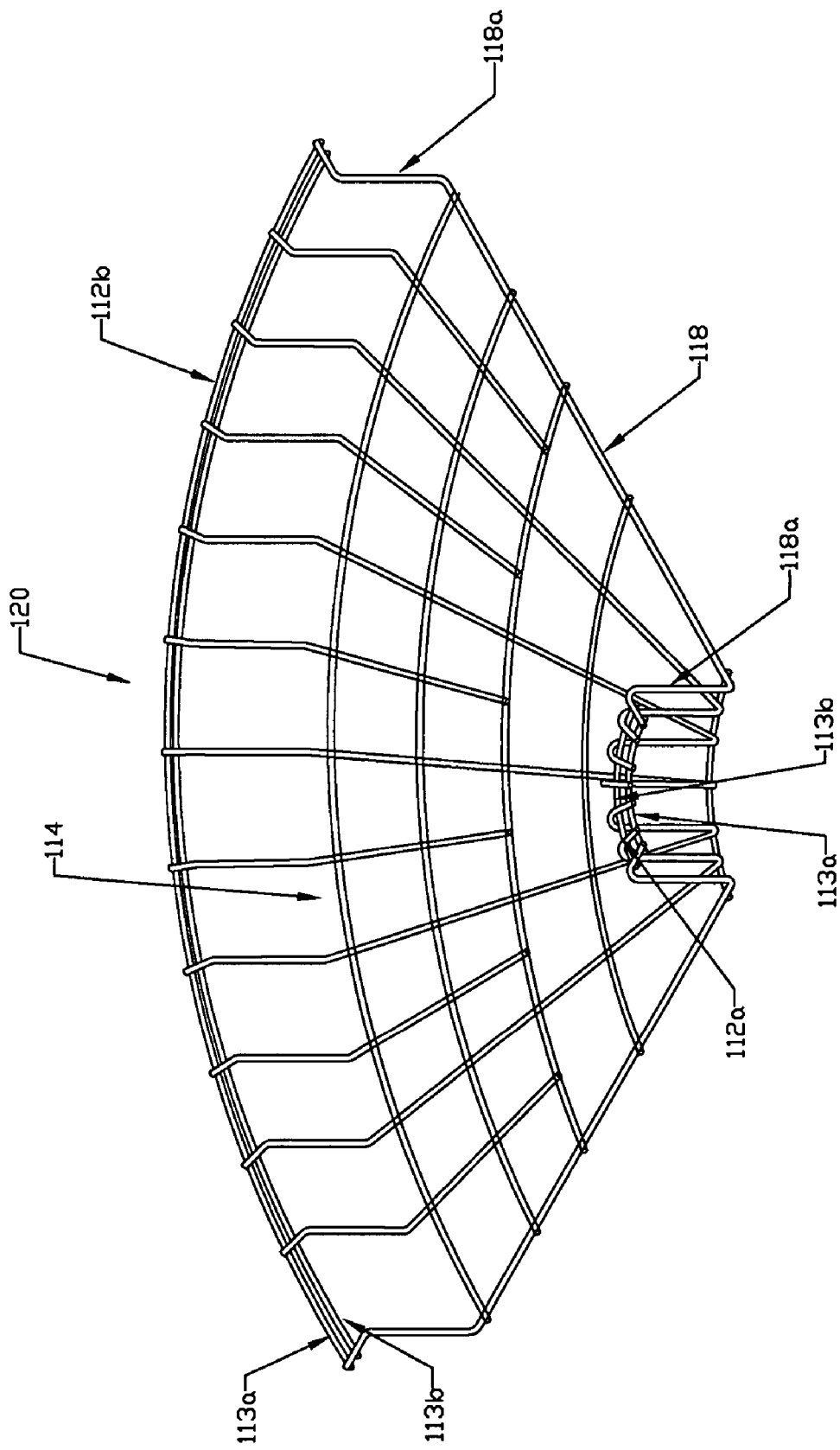
FIG. 5 is a perspective view of an arcuate cable tray of the support system of FIG. 1, according to an embodiment of the present disclosure.

As seen in FIG. 5, cable tray 120 is constructed in substantially the same manner as cable tray 110, however, cable tray 120 is non-linear or has an arcuate configuration in a plane parallel to a plane defined by transverse sections 118. As seen in FIG. 5, longitudinal sections 116 have been radiused so as to form arcuate cable tray 120. As shown, arcuate cable tray 120 is configured and dimensioned such that arcuate cable tray 120 extends through approximately 90°. It is contemplated that arcuate cable tray 120 may be configured and dimensioned such that arcuate cable tray 120 extends through any suitable angle from approximately 0° to approximately 180°.

Figure 6:
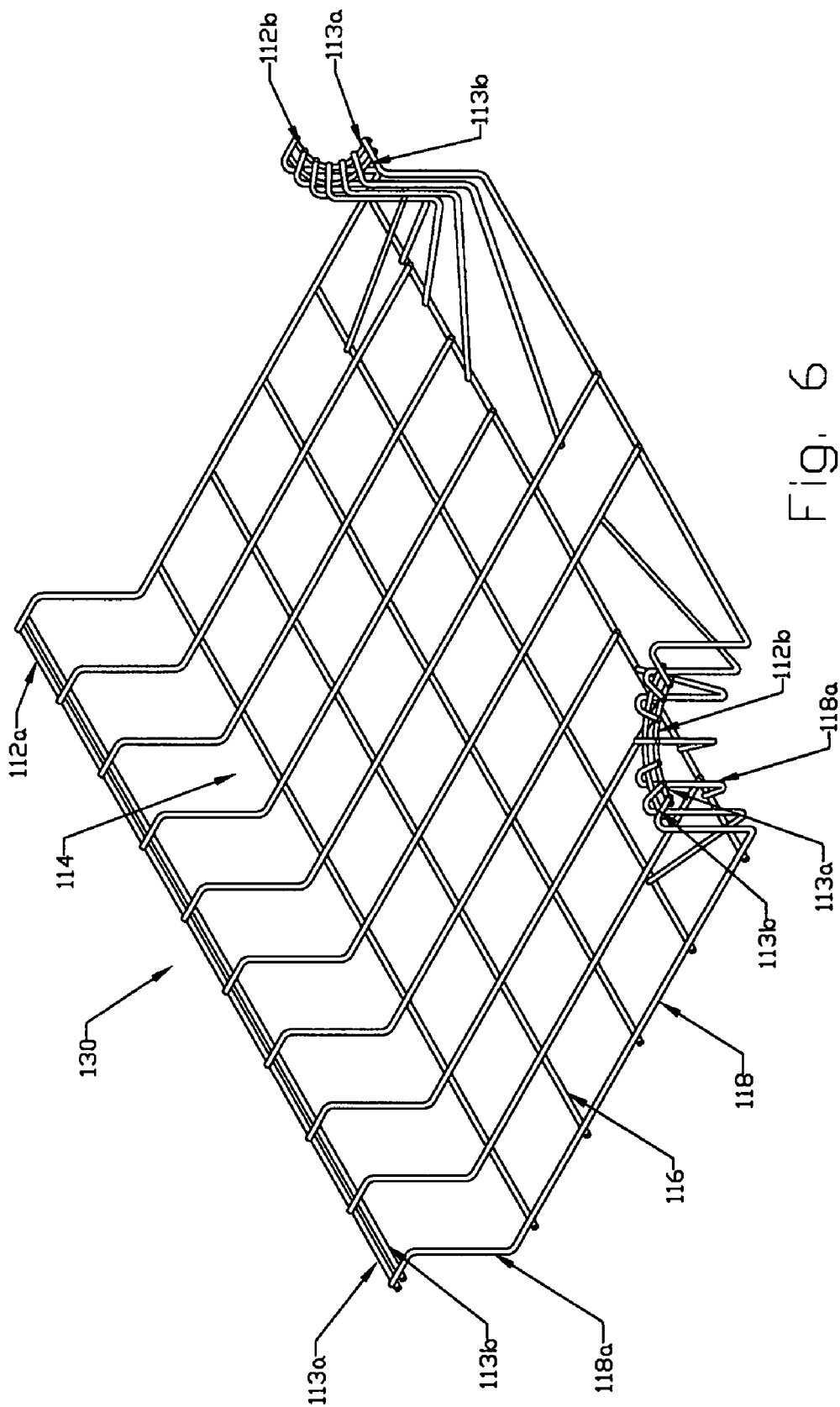
FIG. 6 is a perspective view of a T-shape cable tray of the support system of FIG. 1, according to an embodiment of the present disclosure.

As seen in FIG. 6, cable tray 130 is constructed in substantially the same manner as cable tray 110, however, cable tray 130 has a substantially T-shaped configuration wherein one side wall thereof has been opened to define a passage through a side thereof.

Figure 7:
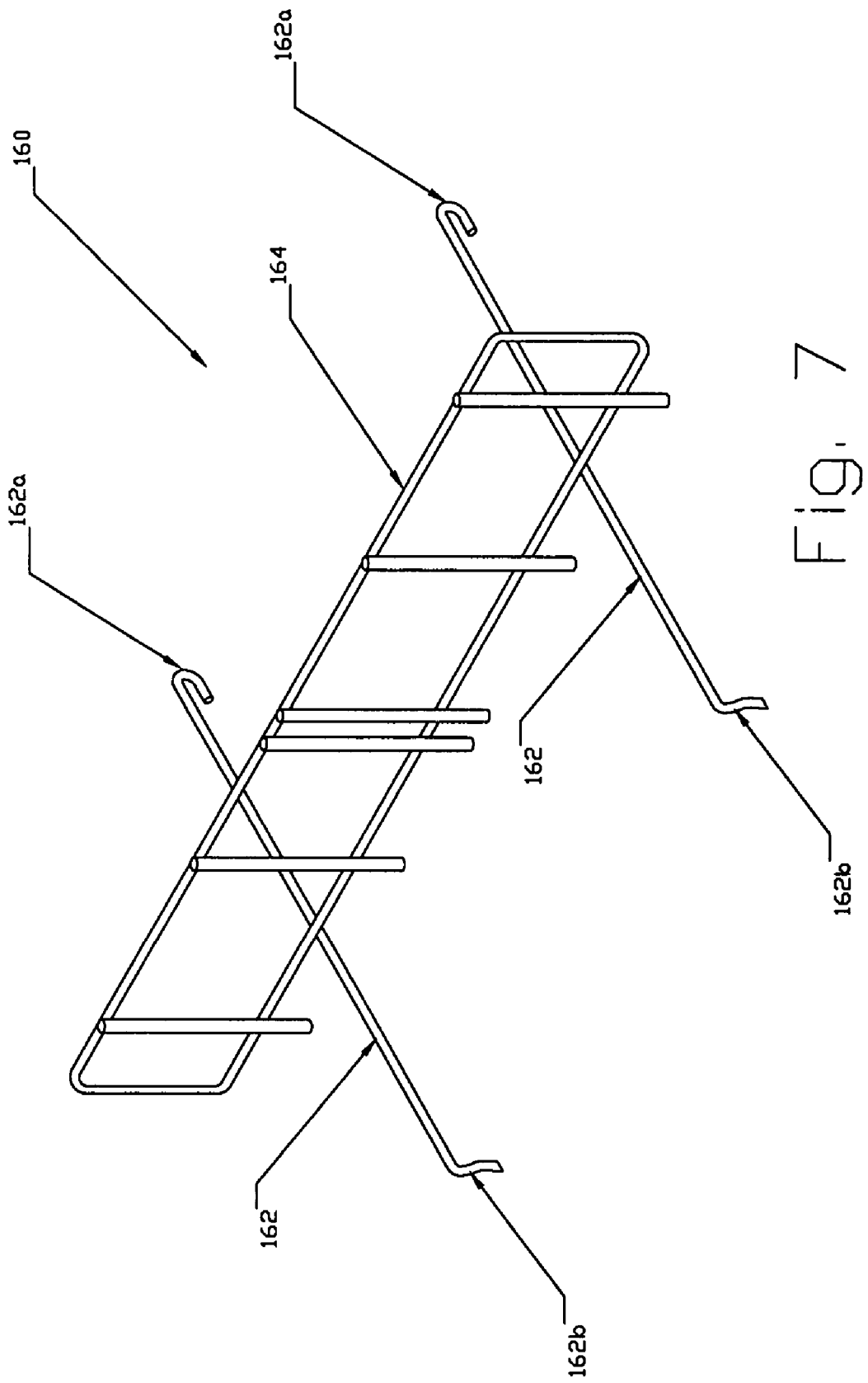
FIG. 7 is a perspective view of a cable tray divider of the support system of FIG. 1.

As seen in FIGS. 1, 7 and 17, cable support system 100 may include a divider 160 selectively connectable to at least some of longitudinal sections 116 and/or transverse sections 118 of cable trays 110, 120 and/or 130. Divider 160 includes a pair of latch members 162 each configured and adapted to selectively engage, for example, longitudinal sections 116 of cable trays 110, 130 and a wall member 164 extending from latch members 162. Wall member 164 may be substantially orthogonal to latch members 162. Each latch member 162 includes a hook feature 162a formed at a first end thereof and a snap-fit engaging feature 162b formed at an opposite end thereof. In use, hook features 162a are slid onto first longitudinal sections 116 of a cable tray 110 and engaging features 162b are snap-fit onto second longitudinal section 116 which are spaced apart from first longitudinal sections 116.

Figure 8:
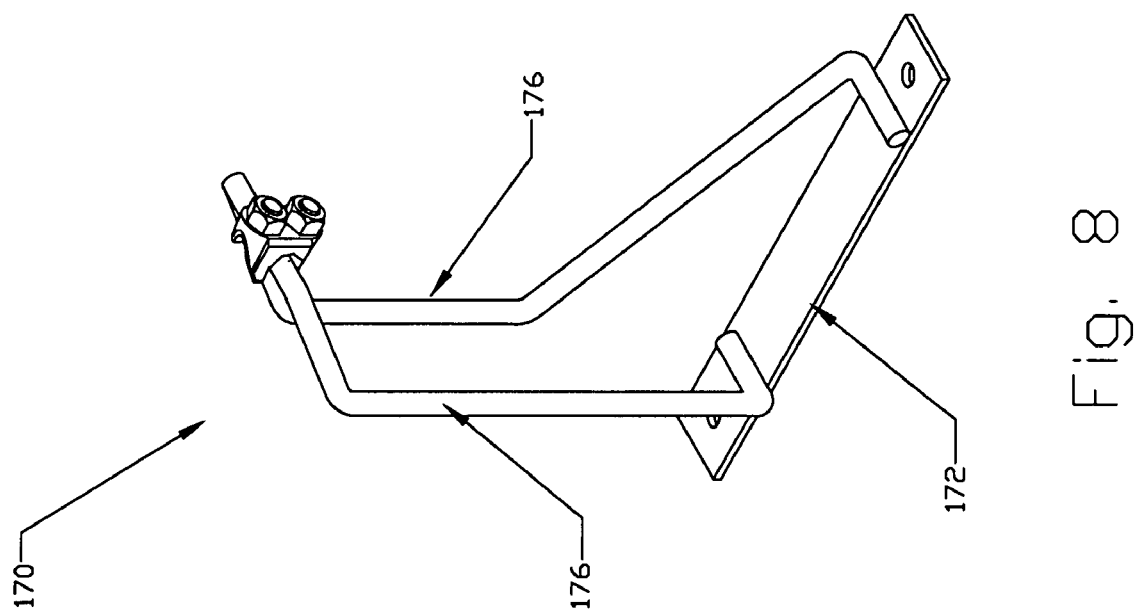
FIG. 8 is a perspective view of a suspension bracket of the support system of FIG. 1.

As seen in FIGS. 1, 8 and 19, cable support system 100 may include a suspension bracket 170 selectively connectable to stringers 112a, 112b. Suspension bracket 170 includes a plate 172 selectively connectable to stringers 112a, 112b by fastening means 174, such as, for example, nuts and bolts or the like. Suspension bracket 170 further includes at least one riser of arm 176 extending from plate 172 and configured to support or suspend a cable management system 200 (see FIG. 9) therefrom.

Figure 9:
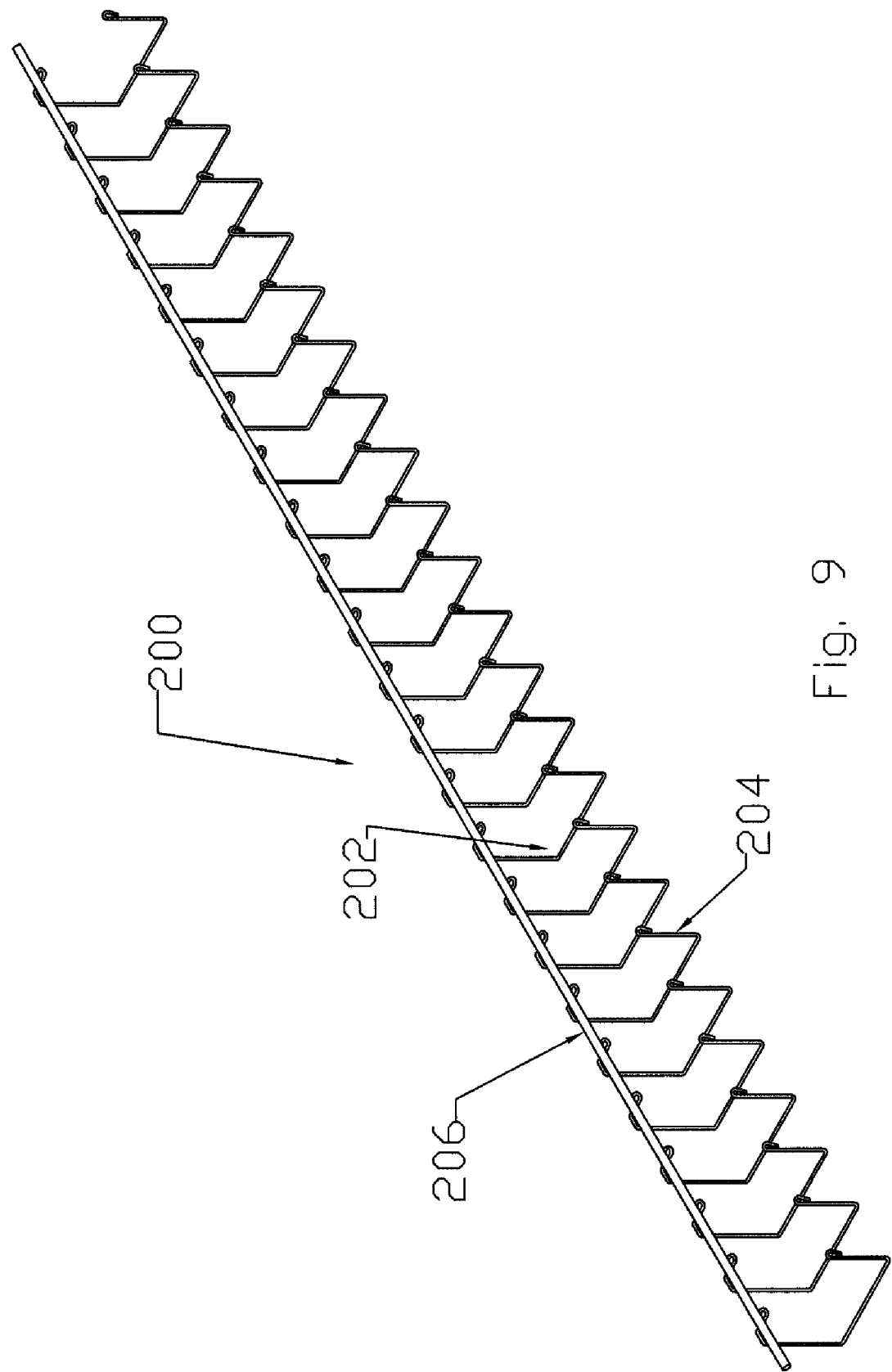
FIG. 9 is a perspective view of a cable management system of the support system of FIG. 1.
Figure 12:
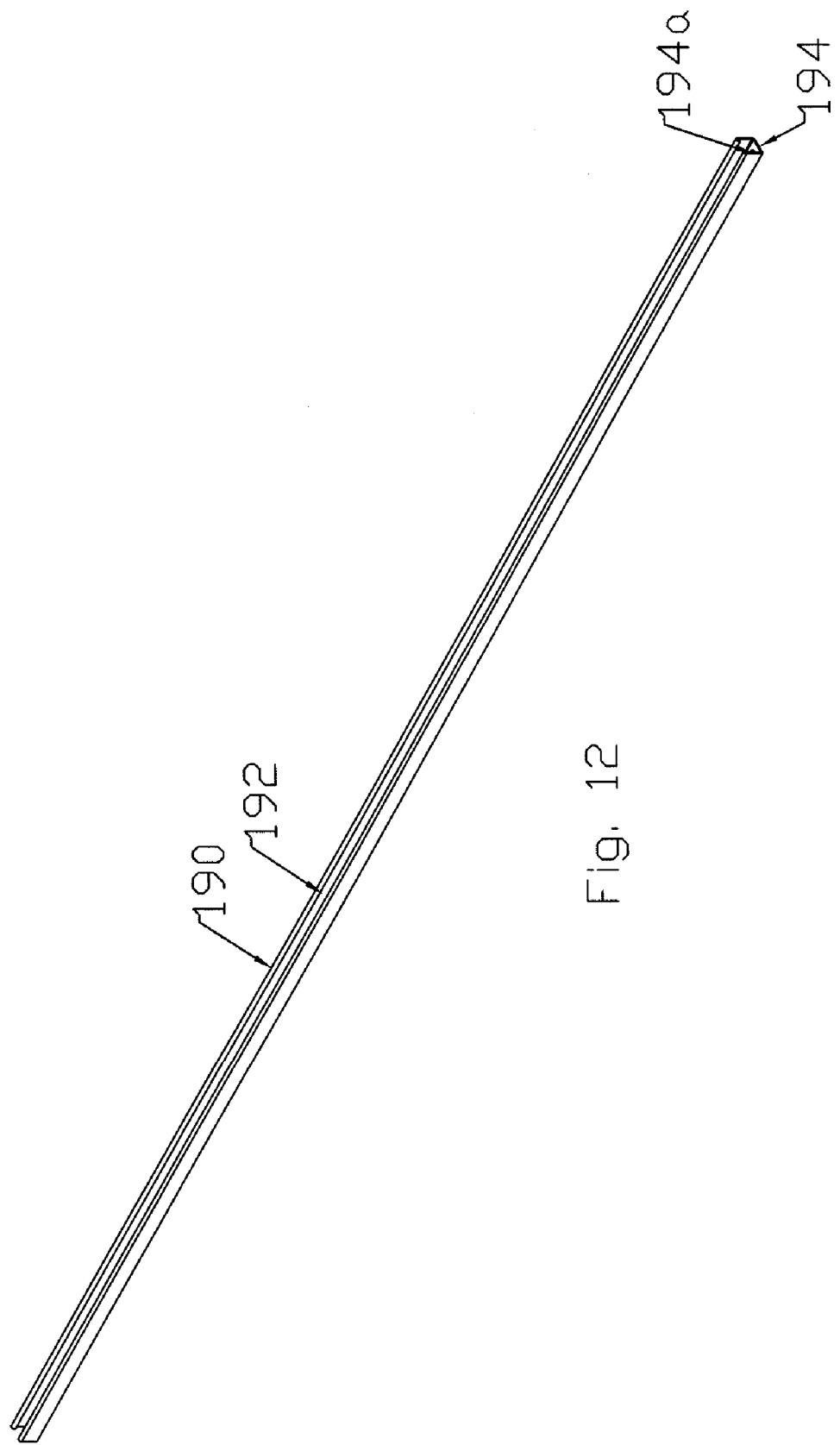
FIG. 12 is a perspective view of a support strut of the support system of FIG. 1.

As seen in FIG. 9, cable management system 200 includes a spine 206 and a plurality of cable supports 204 depending therefrom. Cable supports 204 define a cable retaining portion 202 for receipt and retention of cables (not shown) therein. Reference may be made to U.S. Pat. No. 6,361,000, the entire content of which is incorporated herein by reference for a detailed discussion of cable management system 200.

As seen in FIGS. 1 and 19, cable support system 100 may include a guide 178 configured and adapted to extend between cable management system 200 and cable tray 110 to provide a supported transition therebetween.

Turning now to FIGS. 1, 10 and 11, cable support system 100 may include any number of patch panels 180 or the like selectively securable to any of cable trays 110, 120 or 130. In particular, patch panels 180 may be secured to stringers 112a, 112b of cable trays 110, 120 or 130. Each patch panel 180 includes a plurality of receptacles 182 for selectively receiving and engaging with electrical connectors 182a (see FIGS. 10A and 11A), telephone jacks, data transfer jacks and the like.

As seen in FIGS. 1, 12, 18 and 19, cable support system 100 may include a strut 190 disposed beneath risers 112a, 112b of cable tray 110. Strut 190 may be a U-shaped channel defining an elongate slot 192 therealong. In operation, as seen in FIGS. 1 and 18, free or lower ends of suspension rods 20 may extend through the space between rails 113a, 113b of stringer 112a or 112b and enter U-shaped channel 192 of strut 190. Free ends of suspension rods 20 may extend through U-shaped channel 192 and through apertures 194a formed in a wall 194 thereof. Struts 190 proved additional rigidity to stringers 112a, 112b and ultimately to cable trays 110, 120 and/or 130.

Figure 14:
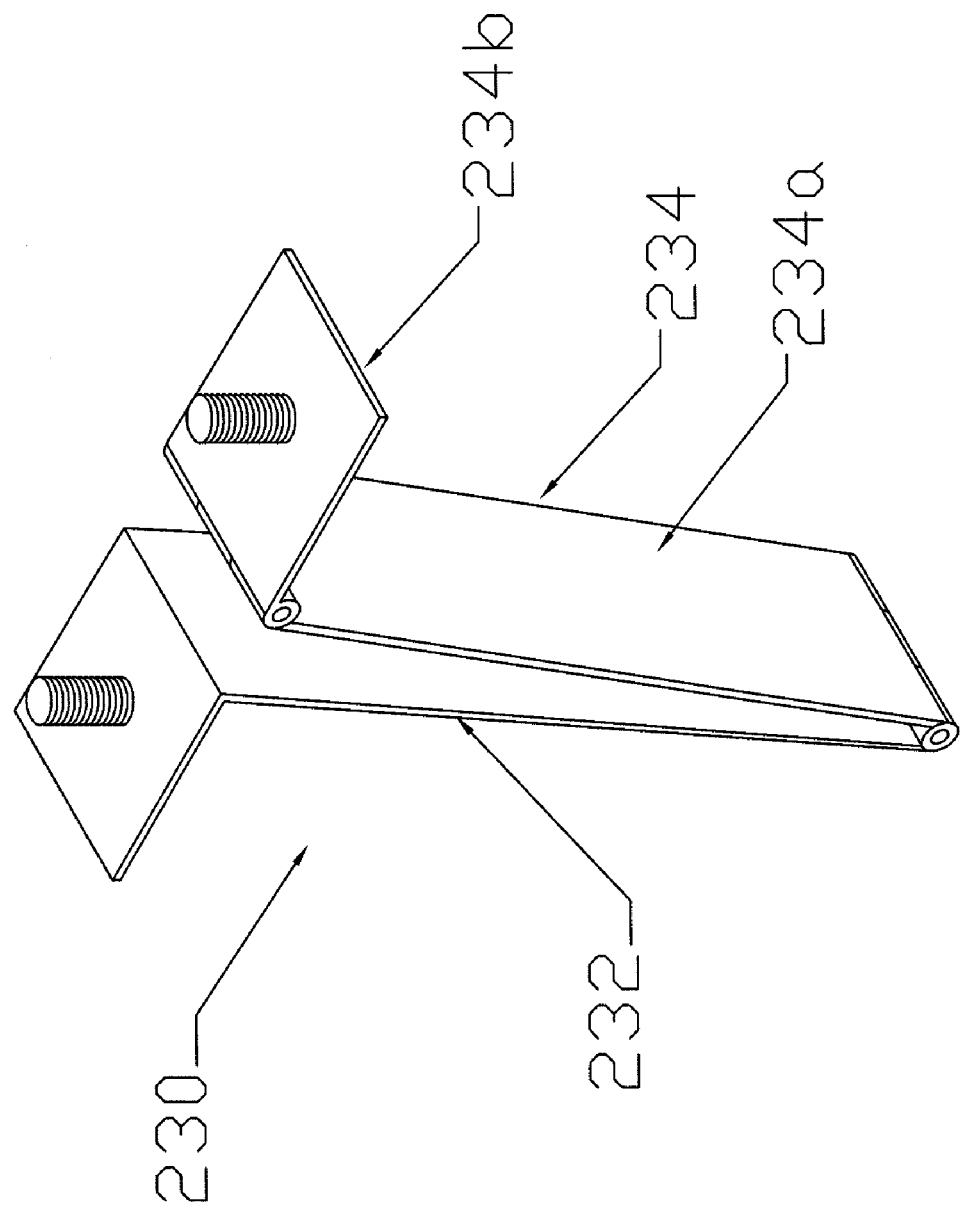
FIG. 14 is a perspective view of a hinge of the support system of FIG. 1.

Turning now to FIGS. 14-16, cable support system 100 may include a hinge 230 for interconnecting a pair of adjacent cable trays 110, 120 or 130 to one another and to permit the adjacent cable trays to be positioned at an angle with respect to one another in a plane transverse to a plane defined by longitudinal sections 116 and transverse sections 118. Hinge 230 includes a first leg 232 having a fixed configuration, and a second leg 234, hingedly connected to first leg 232 and capable of having a varying configuration. First leg 232 has a fixed L-shaped configuration and is configured and adapted for selectively attachment to a stringer 112a, 112b of a cable tray 110, 120 or 130. Second leg 234 includes a first portion 234a hingedly connected to first leg 232 at a first end thereof and a second portion 234b hingedly connected to a second end of first portion 234a. Second portion 234b is configured and adapted for selectively attachment to a stringer 112a, 112b of an adjacent cable tray 110, 120 or 130.

As seen in FIGS. 15 and 16, in use, hinge 230 enabled a first cable tray 110a to pivot downwardly, about a first pivot axis defined between first and second legs 232, 234 of hinge 230, relative to an adjacent second cable tray 110b. Hinge 230 also enables a first cable tray 110a to pivot upwardly, about a second pivot axis defined between first and second portions 234a, 234b of second leg 234, relative to an adjacent second cable tray 110b. Hinge 230 enabled three-dimensional configurations of cable trays 110, 120 and 130.

Figure 21:
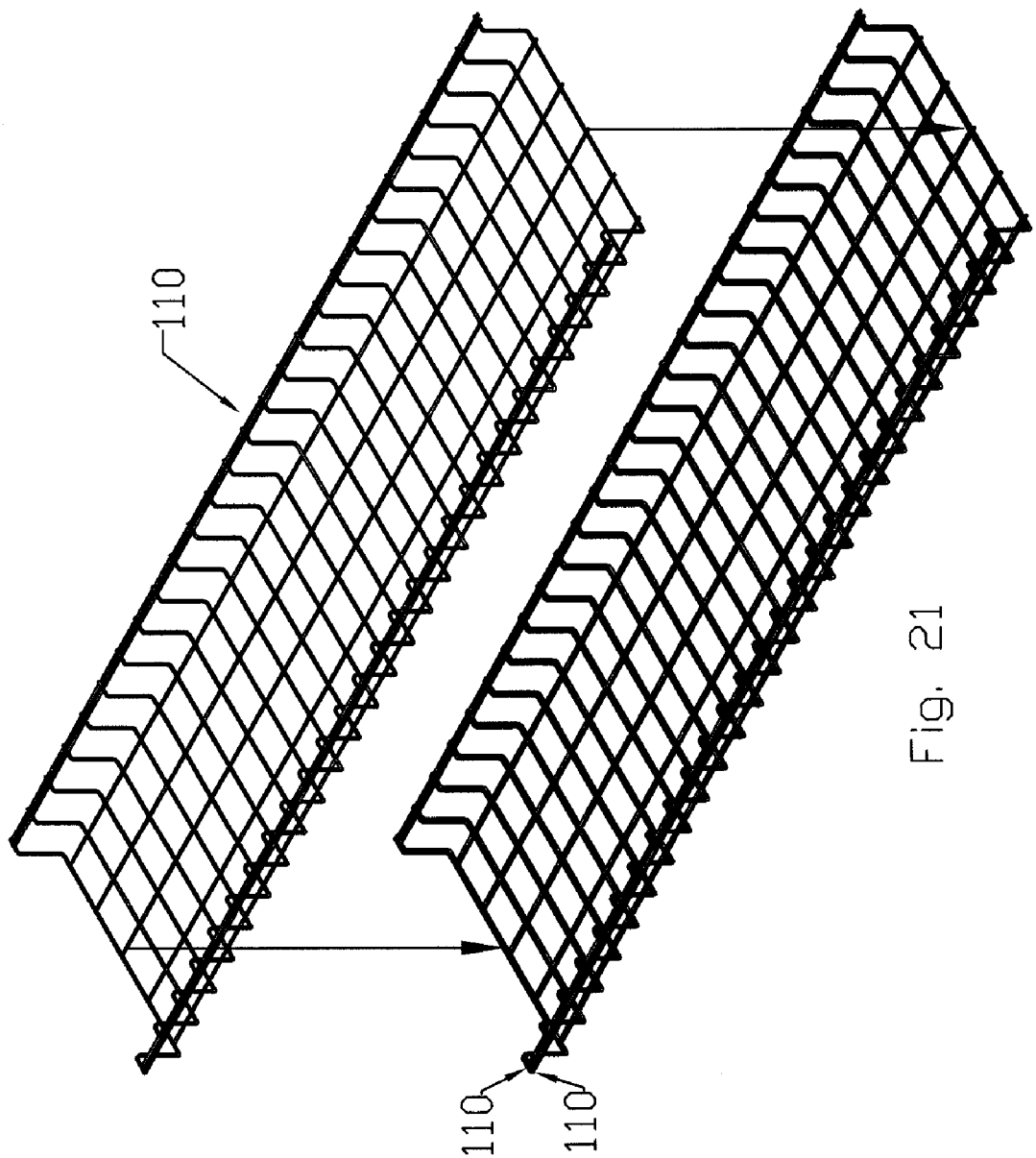
FIG. 21 is an enlarged perspective view of a plurality of cable trays illustrating the stackability and nestability thereof.

As seen in FIG. 21, multiple cable trays 110 may be stacked one on top another in a nesting fashion to reduce the overall height and volume of the cable trays 110 when being stored and/or shipped.

Figure 22:
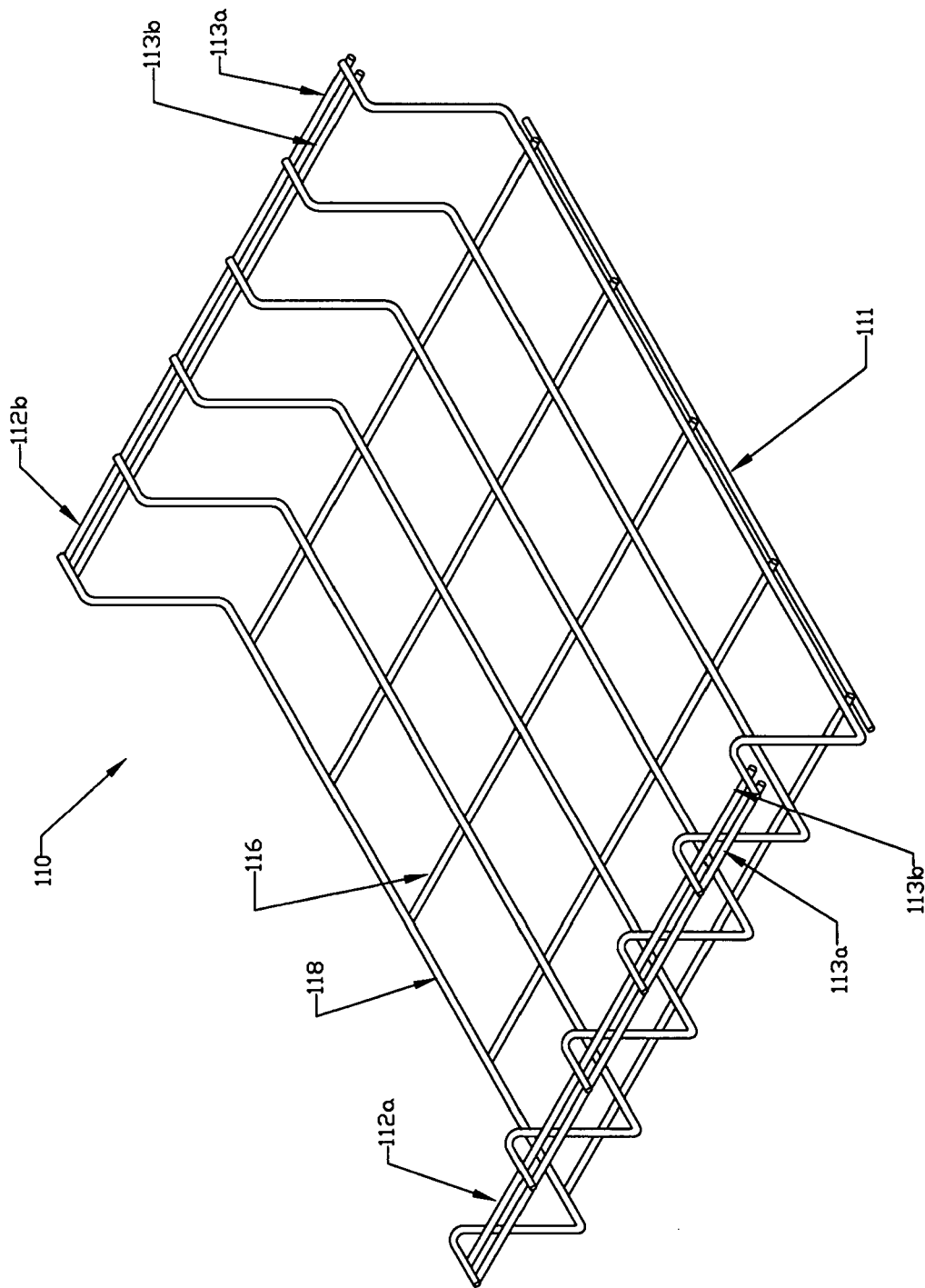
FIG. 22 is a perspective view of a cable tray according to another embodiment of the present disclosure.

As seen in FIG. 22, cable tray 110 may be provided with a reinforcing rib 111 extending transversely across longitudinal sections 116 on a side opposite transverse sections 118. It is contemplated that reinforcing rib 111 may be provided in close proximity to an end of cable tray 110.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure as defined by the appended claims.

What is claimed is:

1. A cable support system, the cable support system comprising:
   a plurality of cable trays, each cable tray including:
      a pair of stringer elements; and
      a channel section depending from the pair of stringer elements, the channel section defining a passageway for supporting runs of cable thereon, the channel section including:

a plurality of riser portions connected to the pair of stringer elements;

a floor spaced a distance from a plane defined by the pair of stringer elements, wherein the floor is supported by the riser portions; and wherein, in a use state, the plurality of cable trays abut end-to-end with and are engaged to one another to form an elongated cable tray for supporting runs of cable thereon and, wherein, in a shipping or storage state, the cable trays are disengaged from one another and are stacked one on top of another in a nesting fashion.

2. The cable tray according to claim 1, wherein the floor includes a plurality of longitudinal sections and a plurality of transverse sections defining a cage-like enclosure.

3. The cable tray according to claim 2, wherein the longitudinal sections are disposed beneath the transverse sections.

4. The cable tray according to claim 3, further comprising at least one transversely extending reinforcing rib disposed beneath the longitudinal sections.

* * * * *